US011549423B2

(12) United States Patent
Lundström

(10) Patent No.: US 11,549,423 B2
(45) Date of Patent: Jan. 10, 2023

(54) SYSTEM AND A METHOD FOR DETERMINING A CAUSE FOR IMPAIRED PERFORMANCE OF A CATALYTIC CONFIGURATION

(71) Applicant: Scania CV AB, Södertälje (SE)

(72) Inventor: Mikael Lundström, Hägersten (SE)

(73) Assignee: Scania CV AB, Södertälje (SE)

( * ) Notice: Subject to any disclaimer, the term of this patent is extended or adjusted under 35 U.S.C. 154(b) by 488 days.

(21) Appl. No.: 16/475,702

(22) PCT Filed: Jan. 15, 2018

(86) PCT No.: PCT/SE2018/050033
§ 371 (c)(1),
(2) Date: Jul. 3, 2019

(87) PCT Pub. No.: WO2018/132059
PCT Pub. Date: Jul. 19, 2018

(65) Prior Publication Data
US 2019/0345865 A1    Nov. 14, 2019

(30) Foreign Application Priority Data
Jan. 16, 2017  (SE) .................................. 1750030-7

(51) Int. Cl.
*F01N 11/00* (2006.01)
*B01D 53/94* (2006.01)
(Continued)

(52) U.S. Cl.
CPC ........ *F01N 11/007* (2013.01); *B01D 53/9431* (2013.01); *B01D 53/9495* (2013.01);
(Continued)

(58) Field of Classification Search
CPC ...... F01N 11/007; F01N 11/002; F01N 3/266; F01N 2550/02; F01N 2550/05;
(Continued)

(56) References Cited

U.S. PATENT DOCUMENTS

| 6,230,487 B1 * | 5/2001 | Blumenstock | ......... B01D 53/96 60/277 |
| 9,856,773 B1 * | 1/2018 | Park | ....................... F01N 11/007 |

(Continued)

FOREIGN PATENT DOCUMENTS

| EP | 2 681 423 B1 | 11/2015 |
| WO | WO 2013/165302 A1 | 11/2013 |

OTHER PUBLICATIONS

International Search Report dated Mar. 9, 2018 in corresponding PCT International Application No. PCT/SE2018/050033.
(Continued)

*Primary Examiner* — Devon C Kramer
*Assistant Examiner* — Kelsey L Stanek
(74) *Attorney, Agent, or Firm* — Banner & Witcoff, Ltd.

(57) ABSTRACT

A method that determines a cause for the impaired performance of a catalytic configuration of the exhaust gas of a combustion engine (231), the method including determining (s410) a course of a NOx-conversion ratio; determining (s420) a prevailing temperature of the catalytic configuration; increasing (s430) the temperature of the catalytic configuration from a prevailing temperature below a predetermined temperature value (Te) to a temperature (TSred) above the predetermined temperature value above which sulphur is removed from the catalytic configuration; and/or decreasing (s440) the temperature of the catalytic configuration from a prevailing temperature (TSred) above the predetermined temperature value (Te) to a temperature below the predetermined temperature value so as to impair
(Continued)

the performance of the catalytic configuration in case sulphur is present; and determining (s450) one cause out of a set of causes on the basis of the course of the NOx-conversion ratio thus determined.

13 Claims, 5 Drawing Sheets

(51) Int. Cl.
    *F01N 3/20*     (2006.01)
    *G01N 31/10*     (2006.01)

(52) U.S. Cl.
    CPC ........... *F01N 3/208* (2013.01); *F01N 3/2066* (2013.01); *F01N 11/002* (2013.01); *G01N 31/10* (2013.01); *F01N 2550/02* (2013.01); *F01N 2550/05* (2013.01)

(58) Field of Classification Search
    CPC . F01N 3/208; B01D 53/9431; B01D 53/9495; G01N 31/10
    USPC .......................................................... 436/37
    See application file for complete search history.

(56) References Cited

U.S. PATENT DOCUMENTS

| | | | | |
|---|---|---|---|---|
| 2005/0144933 | A1* | 7/2005 | Enoki | F02D 41/0235 60/277 |
| 2008/0104946 | A1 | 5/2008 | Wang et al. | 60/295 |
| 2009/0019836 | A1* | 1/2009 | Nagaoka | F02D 41/0275 60/285 |
| 2009/0049899 | A1 | 2/2009 | Hjorsberg et al. | 73/114.75 |
| 2009/0113875 | A1* | 5/2009 | Miyake | F01N 11/002 60/277 |
| 2010/0089040 | A1 | 4/2010 | Handa | 60/287 |
| 2011/0146242 | A1* | 6/2011 | Kawase | F01N 3/035 60/277 |
| 2012/0285139 | A1 | 11/2012 | Geyer | 60/274 |
| 2013/0067989 | A1* | 3/2013 | Seo | G01N 25/28 73/23.31 |
| 2015/0096287 | A1 | 4/2015 | Qi | |
| 2015/0354424 | A1* | 12/2015 | Kumar | F01N 3/208 60/605.1 |
| 2016/0115838 | A1* | 4/2016 | Girardi | F01N 9/00 701/102 |
| 2016/0376972 | A1* | 12/2016 | Hagimoto | F01N 3/2066 60/276 |

OTHER PUBLICATIONS

Written Opinion dated Mar. 9, 2018 in corresponding PCT International Application No. PCT/SE2018/050033.
Sep. 13, 2022—(BR) Preliminary Office Action—App. No. BR 11 2019 013518 9.

* cited by examiner

SYSTEM AND A METHOD FOR DETERMINING A CAUSE FOR IMPAIRED PERFORMANCE OF A CATALYTIC CONFIGURATION

CROSS-REFERENCE TO RELATED APPLICATIONS

The present application is a 35 U.S.C. § 371 national phase conversion of PCT/SE2018/050033, filed Jan. 15, 2018, which claims priority of Swedish Patent Application No. 1750030-7, filed Jan. 16, 2017, the contents of all of which are incorporated herein by reference. The PCT International Application was published in the English language.

TECHNICAL FIELD

The present invention relates to a) a method for determining a cause for impaired performance of a catalytic configuration, b) a computer program product comprising program code for a computer for implementing a method according to the invention, and c) a system for determining a cause for impaired performance of a catalytic configuration and a motor vehicle equipped with the system.

In particular the present invention relates to a system and a method for determining a cause for impaired performance of a catalytic configuration for emission control of the exhaust gas of a combustion engine, said catalytic configuration being arranged for $NO_x$-conversion.

BACKGROUND ART

Vehicle combustion engine emission control systems are today arranged with catalytic configurations e.g. for conversion of $NO_x$ gas. The catalytic configurations may comprise a DOC-unit (Diesel Oxidation Catalyst), DPF-unit (Diesel Particulate Filter), SCR-unit (Selective Catalytic Reduction) and ammonia slip catalyst. In such a system it is common to provide a reducing agent for reducing a prevailing $NO_x$-content of an exhaust gas of said engine. Said catalytic configuration may be impaired by sulphur poisoning. This may be the case if the vehicle has been fuelled by a fuel having too high sulphur content. Hereby said catalytic configuration, and said SCR-unit in particular, may present a gradually decreased performance. Said other members of the catalytic configuration may also comprise catalytic elements which may be subjected to sulphur poisoning. Hereby the overall performance of the catalytic configuration may be impaired over time.

If the performance of any of the elements of the catalytic configuration is impaired diagnosis procedures of the emission control system may result in generated error code, and possibly even torque reducing actions regarding said combustion engine.

It should be noted that a number of various causes may impair performance of said catalytic configuration.

A first cause may be manual tampering of a reducing agent dosing system of the emission control system. Hereby a diluted reducing agent, or another liquid, such as water, may be provided to a reducing agent tank. Such active tampering will provide a cheaper alternative but also negatively impact on the tail pipe $NO_x$-content, which naturally would have a negative impact on the environment and may thus violate prevailing laws and regulations.

A second cause may be said sulphur poisoning. If fuel of the engine contains too high values of sulphur, poisoning of catalytic material of the catalytic configuration may be caused. If the catalytic configuration is subjected to sulphur poisoning, a $NO_x$-conversion ratio of the emission control system is decreased compared to if no sulphur poisoning is at hand.

A third cause may be natural aging of said catalytic configuration. This phenomena may cause the catalytic configuration to slowly lose performance over time. The degradation due to this cause is typically quite linear over time.

A fourth cause may be an accelerated aging of said catalytic configuration. This phenomena is similar to natural aging but performance of the catalytic configuration is degraded at a higher rate compared to natural aging. Also this kind of degradation may typically be quite linear over time.

A fifth cause may be any mechanical failure of said catalytic configuration.

It is desired to be able to diagnose the catalytic configuration so as to determine which cause is at hand. In particular it is important to determine if sulphur poisoning of the catalytic configuration or manual tampering of the emission control system is at hand. Hereby adequate measures may be taken, such as generating error code or controlling operation of the vehicle according to certain routines, including engine torque limitations.

US2015096287 relates to a multi-stage SCR control and diagnostic system.

SUMMARY OF THE INVENTION

An object of the present invention is to propose a novel and advantageous method for determining a cause for impaired performance of a catalytic configuration for emission control of exhaust gas of a combustion engine, said catalytic configuration being arranged for $NO_x$-conversion.

Another object of the invention is to propose a novel and advantageous system and a novel and advantageous computer program for determining a cause for impaired performance of a catalytic configuration for emission control of exhaust gas of a combustion engine, said catalytic configuration being arranged for $NO_x$-conversion.

Another object of the present invention is to propose a novel, advantageous, cost effective, and reliable method for determining a cause for impaired performance of a catalytic configuration for emission control of exhaust gas of a combustion engine, said catalytic configuration being arranged for $NO_x$-conversion.

Another object of the invention is to propose a novel and advantageous system and a novel and advantageous computer program providing a cost effective and reliable determination of a cause for impaired performance of a catalytic configuration for emission control of exhaust gas of a combustion engine, said catalytic configuration being arranged for $NO_x$-conversion.

Yet another object of the invention is to propose a method, a system and a computer program achieving a robust, accurate and automated determination of a cause for impaired performance of a catalytic configuration for emission control of exhaust gas of a combustion engine, said catalytic configuration being arranged for $NO_x$-conversion.

Yet another object of the invention is to propose an alternative method, an alternative system and an alternative computer program for determining a cause for impaired performance of a catalytic configuration for emission control of exhaust gas of a combustion engine, said catalytic configuration being arranged for $NO_x$-conversion.

Some of these objects are achieved with the claimed method. Other objects are achieved with a system in accordance with what is depicted herein. Advantageous embodiments are depicted in the dependent claims. Substantially the same advantages of method steps of the innovative method hold true for corresponding means of the innovative system.

According to an aspect of the invention there is provided a method for determining a cause for impaired performance of a catalytic configuration for emission control of exhaust gas of a combustion engine, said catalytic configuration being arranged for $NO_x$-conversion, comprising the steps of:
continuously or intermittently determining a course of a $NO_x$-conversion ratio;
continuously or intermittently determining a prevailing temperature of said catalytic configuration;
increasing the temperature of said catalytic configuration from a prevailing temperature below a predetermined temperature value to a temperature above said predetermined temperature value, said predetermined temperature value representing a temperature above which sulphur, poisoning said catalytic configuration, is removed from said catalytic configuration so as to improve the performance of said catalytic configuration in case of sulphur, poisoning said catalytic configuration, is present; and/or
decreasing the temperature of said catalytic configuration from a prevailing temperature above said predetermined temperature value to a temperature below said predetermined temperature value so as to impair the performance of said catalytic configuration in case of sulphur, poisoning said catalytic configuration, is present; and
determining one cause out of a set of causes on the basis of said course of said $NO_x$-conversion ratio thus determined.

Hereby a reliable and cost effective diagnosis method is provided for a catalytic configuration for emission control of exhaust gas of a combustion engine.

By controlling the temperature of the catalytic configuration and analysing the development of the course of the $NO_x$-conversion ratio over time one cause may be identified. The temperature may be controlled in a number of different ways, e.g. by means of post injections of fuel into said engine, exhaust brake, fuel provision directly into said catalytic configuration, etc.

Since the courses of the $NO_x$-conversion ratios due to the different causes present different characteristics it is possible to identify which particular cause is associated to the impaired performance of the catalytic configuration. This is explained in greater detail with reference to for example FIG. 3a, FIG. 3b and FIG. 4b.

Said predetermined temperature value above which sulphur, poisoning said catalytic configuration, is removed from said catalytic configuration, may be determined in a test cell. This predetermined temperature value may be related to the unique catalytic configuration or to a serial production of a model of said catalytic configuration. Said predetermined temperature value may be e.g. 300 degrees Celsius.

When controlling said temperature it is advantageous to increase said temperature to a certain suitable extent regarding said predetermined temperature value when increasing said temperature. Likewise, when controlling said temperature it is advantageous to decrease said temperature to a certain suitable extent regarding said predetermined temperature value when decreasing said temperature. By controlling the temperature in this way more distinct changes in the course of said $NO_x$-conversion ratio will be present.

It should be noted that reduction of sulphur poisoning is performed gradually at temperatures exceeding said predetermined temperature value. In a similar way sulphur poisoning is performed gradually at temperatures below said predetermined temperature value. Said predetermined temperature value is a suitable temperature value.

The method may comprise the step of:
taking the presence of poisoning sulphur in said catalytic configuration as said one cause for impaired performance of said catalytic configuration when said course of said $NO_x$-conversion ratio reveals an increased performance when the temperature is increased above said predetermined temperature value and exclude other causes of said set of causes.

The method may comprise the step of:
taking the presence of poisoning sulphur in said catalytic configuration as said one cause for impaired performance of said catalytic configuration when said course of said $NO_x$-conversion ratio reveals a decreased performance when the temperature is decreased below said predetermined temperature value and exclude other causes of said set of causes.

Hereby sulphur poisoning may be determined in a cost effective, reliable and user friendly manner. By identifying sulphur poisoning as the cause of impaired performance proper measures may be taken by a control unit of the engine and/or emission control system. Hereby error code may be generated instead of introducing any control measures of the engine and/or emission control system, such as engine output torque limitation. According to one embodiment the temperature of said catalytic configuration may be controlled so that it exceeds said predetermined temperature value for a certain time period. Hereby sulphur poisoning said catalytic configuration may be removed. Such a time period may be 30 minutes, or more.

The method may comprise the step of:
taking use of a low concentration of a reducing agent introduced for $NO_x$-conversion in said exhaust gas as said one cause for impaired performance of said catalytic configuration when a change of said reducing agent to a proper concentration reducing agent reveals an increased performance of said catalytic configuration or when a change of said reducing agent from a proper concentration to a low concentration reducing agent reveals an impaired performance of said catalytic configuration. According to one example an impaired $NO_x$-conversion ratio may be associated with a refill-event regarding said reductant. Hereby suitable means for detecting a refill-event regarding said reductant is provided and arranged for communication with a control unit for managing the inventive method.

The method may comprise the step of:
determining a change rate of said course of $NO_x$-conversion ratio and taking use of a low concentration of a reducing agent introduced for $NO_x$-conversion in said exhaust gas as said one cause of said set of causes if said change rate exceeds a certain characteristic value. Said characteristic value may be a predetermined value. Said change rate may have a positive sign or a negative sign (positive time derivative or negative time derivative).

Hereby it is possible to distinguish a determined course of said $NO_x$-conversion ratio relating to sulphur poisoning from a determined course of said $NO_x$-conversion ratio relating to a low concentration of a reducing agent introduced for $NO_x$-conversion in said exhaust gas in a reliable and cost effective way.

According to an example there is provided a method for determining a cause for impaired performance of a catalytic configuration for emission control of exhaust gas of a combustion engine, said catalytic configuration being arranged for $NO_x$-conversion, the method comprising the steps of:

continuously or intermittently determining a course of a $NO_x$-conversion ratio;

continuously or intermittently determining a prevailing temperature of said catalytic configuration;

increasing the temperature of said catalytic configuration from a prevailing temperature below a predetermined temperature value to a temperature above said predetermined temperature value, said predetermined temperature value representing a temperature above which sulphur, poisoning said catalytic configuration, is removed from said catalytic configuration so as to improve the performance of said catalytic configuration in case of sulphur, poisoning said catalytic configuration, is present; and/or decreasing the temperature of said catalytic configuration from a prevailing temperature above said predetermined temperature value to a temperature below said predetermined temperature value so as to impair the performance of said catalytic configuration in case of sulphur, poisoning said catalytic configuration, is present; and determining if sulphur poisoning or a low concentration of a reducing agent introduced for $NO_x$-conversion in said exhaust gas is the cause of impaired performance of said catalytic configuration on the basis of said course of said $NO_x$-conversion ratio thus determined.

The method may comprise the step of:

determining said one cause out of a set of causes comprising presence of poisoning sulphur, low concentration of a reducing agent introduced for $NO_x$-conversion in said exhaust gas, aging of the catalytic substances of said catalytic configuration and undesired defects related to said catalytic configuration. Hereby a versatile method is provided.

Said catalytic configuration may comprise one or more SCR-units. Said catalytic configuration may comprise a DOC-unit. Said catalytic configuration may comprise a DPF-unit. Said catalytic configuration may comprise an ASC-unit (ammonia slip catalyst).

Said catalytic configuration may be arranged for $NO_x$-conversion or arranged to promote $NO_x$-conversion. Hereby an SCR-unit may be arranged for $NO_x$-conversion of an exhaust gas. Hereby a DPF-unit and/or a DOC-unit and/or an ASC-unit may be arranged for promoting $NO_x$-conversion of an exhaust gas.

According to an example there is provided a method for determining a cause for impaired performance of a catalytic configuration for the emission control of the exhaust gas of a combustion engine, said catalytic configuration being arranged for $NO_x$-conversion, the method comprising the steps of:

continuously or intermittently determining a course of a $NO_x$-conversion ratio;

continuously or intermittently determining a prevailing temperature of said catalytic configuration;

increasing the temperature of said catalytic configuration from a prevailing temperature below a predetermined temperature value to a temperature above said predetermined temperature value, said predetermined temperature value representing a temperature above which sulphur, poisoning said catalytic configuration, is removed from said catalytic configuration so as to improve the performance of said catalytic configuration in case of sulphur, poisoning said catalytic configuration, is present; and determining one cause out of a set of causes on the basis of said course of said $NO_x$-conversion ratio thus determined. Hereby the temperature is only controlled to be increased, and not decreased, which advantageously provides a time effective method.

According to an aspect of the invention there is provided a method for determining a cause for impaired performance of a catalytic configuration for the emission control of the exhaust gas of a combustion engine, said catalytic configuration being arranged for $NO_x$-conversion, the method comprising the steps of:

continuously or intermittently determining a course of a $NO_x$-conversion ratio;

continuously or intermittently determining a prevailing temperature of said catalytic configuration;

decreasing the temperature of said catalytic configuration from a prevailing temperature above said predetermined temperature value to a temperature below said predetermined temperature value so as to impair the performance of said catalytic configuration in case of sulphur, poisoning said catalytic configuration, is present; and determining one cause out of a set of causes on the basis of said course of said $NO_x$-conversion ratio thus determined. Hereby the temperature is only controlled to be decreased, and not increased, which advantageously provides a time effective method.

According to an example there is provided a method for determining a cause for impaired performance of a catalytic configuration for the emission control of the exhaust gas of a combustion engine, said catalytic configuration being arranged for $NO_x$-conversion, the method comprising the steps of:

continuously or intermittently determining a course of a $NO_x$-conversion ratio;

continuously or intermittently determining a prevailing temperature of said catalytic configuration;

increasing the temperature of said catalytic configuration from a prevailing temperature below a predetermined temperature value to a temperature above said predetermined temperature value, said predetermined temperature value representing a temperature above which sulphur, poisoning said catalytic configuration, is removed from said catalytic configuration so as to improve the performance of said catalytic configuration in case of sulphur, poisoning said catalytic configuration, is present; and/or decreasing the temperature of said catalytic configuration from a prevailing temperature above said predetermined temperature value to a temperature below said predetermined temperature value so as to impair the performance of said catalytic configuration in case of sulphur, poisoning said catalytic configuration, is present; and determining the cause for impaired performance of the catalytic configuration to be sulphur poisoning or manual tampering with the catalytic configuration on the basis of said course of said $NO_x$-conversion ratio thus determined.

According to one embodiment there is provided a system for determining a cause for impaired performance of a catalytic configuration for emission control of exhaust gas of a combustion engine, said catalytic configuration being arranged for $NO_x$-conversion, comprising:
  means being arranged to continuously or intermittently determine a course of a $NO_x$-conversion ratio;
  means being arranged to continuously or intermittently determine a prevailing temperature of said catalytic configuration;
  means being arranged to increase the temperature of said catalytic configuration from a prevailing temperature below a predetermined temperature value to a temperature above said predetermined temperature value, said predetermined temperature value representing a temperature above which sulphur, poisoning said catalytic configuration, is removed from said catalytic configuration so as to improve the performance of said catalytic configuration in case of sulphur, poisoning said catalytic configuration, is present; and/or
  means being arranged to decrease the temperature of said catalytic configuration from a prevailing temperature above said predetermined temperature value to a temperature below said predetermined temperature value so as to impair the performance of said catalytic configuration in case of sulphur, poisoning said catalytic configuration, is present; and
  means being arranged to determine one cause out of a set of causes on the basis of said course of said $NO_x$-conversion ratio thus determined.

The system may comprise:
means being arranged to take the presence of poisoning sulphur in said catalytic configuration as said one cause for impaired performance of said catalytic configuration when said course of said $NO_x$-conversion ratio reveals an increased performance when the temperature is increased above said predetermined temperature value and exclude other causes of said set of causes.

The system may comprise:
means being arranged to take the presence of poisoning sulphur in said catalytic configuration as said one cause for impaired performance of said catalytic configuration when said course of said $NO_x$-conversion ratio reveals a decreased performance when the temperature is decreased below said predetermined temperature value and exclude other causes of said set of causes.

The system may comprise:
means being arranged to take use of a low concentration of a reducing agent introduced for $NO_x$-conversion in said exhaust gas as said one cause for impaired performance of said catalytic configuration when a change of said reducing agent to a proper concentration reducing agent reveals an increased performance of said catalytic configuration or when a change of said reducing agent from a proper concentration to a low concentration reducing agent reveals an impaired performance of said catalytic configuration.

The system may comprise:
means being arranged to determine a change rate of said course of $NO_x$-conversion ratio and taking use of a low concentration of a reducing agent introduced for $NO_x$-conversion in said exhaust gas as said one cause of said set of causes if said change rate exceeds a certain characteristic value.

The system may comprise:
means being arranged to determine said one cause out of a set of causes comprising presence of poisoning sulphur, low concentration of a reducing agent introduced for $NO_x$-conversion in said exhaust gas, aging of the catalytic substances of said catalytic configuration and undesired defects related to said catalytic configuration.

According to an aspect of the invention there is provided a vehicle comprising a system according to what is presented herein. Said vehicle may be any from among a truck, bus or passenger car. According to an embodiment the system is provided for a marine application or industrial application.

According to an aspect of the invention there is provided a computer program, wherein said computer program comprises program code for causing an electronic control unit or a computer connected to the electronic control unit to perform anyone of the method steps depicted herein, when run on said electronic control unit or said computer.

According to an aspect of the invention there is provided a computer program, wherein said computer program comprises program code stored on a computer-readable medium for causing an electronic control unit or a computer connected to the electronic control unit to perform anyone of the method steps depicted herein.

According to an aspect of the invention there is provided a computer program, wherein said computer program comprises program code stored on a computer-readable medium for causing an electronic control unit or a computer connected to the electronic control unit to perform anyone of the method steps depicted herein, when run on said electronic control unit or said computer.

According to an aspect of the invention there is provided a computer program product containing a program code stored on a computer-readable medium for performing anyone of the method steps depicted herein, when said computer program is run on an electronic control unit or a computer connected to the electronic control unit.

According to an aspect of the invention there is provided a computer program product containing a program code stored, in a non-volatile manner, on a computer-readable medium for performing anyone of the method steps depicted herein, when said computer program is run on an electronic control unit or a computer connected to the electronic control unit.

According to an aspect of the invention there is provided a computer program product comprising instructions which, when the program is executed by a computer, cause the computer to carry out any of the steps of the method depicted herein.

According to an aspect of the invention there is provided a computer-readable storage medium comprising instructions which, when executed by a computer, cause the computer to carry out any of the steps of the method depicted herein.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and in which.

DETAILED DESCRIPTION

Figure 1:
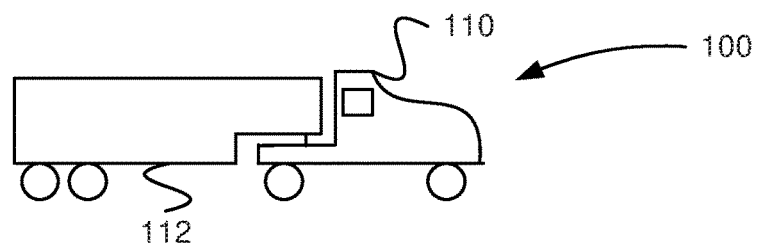
FIG. 1 schematically illustrates a vehicle according to an embodiment of the invention.

FIG. 1 depicts a side view of a vehicle 100. The exemplified vehicle 100 comprises a tractor unit 110 and a trailer 112. The vehicle 100 may be a heavy vehicle, e.g. a truck or a bus. It may alternatively be a car.

It should be noted that the inventive system is applicable to various vehicles, such as e.g. a mining machine, tractor, dumper, wheel-loader, platform comprising an industrial robot, forest machine, earth mover, road construction vehicle, road planner, emergency vehicle or a tracked vehicle.

It should be noted that the invention is suitable for application in various systems comprising a combustion engine and an associated emission control system. The invention is suitable for application in various systems comprising a combustion engine and a catalytic configuration. Said catalytic configuration may comprise at least one SCR-unit. Said catalytic configuration may comprise one or more DOC-units, DPF-units (Diesel Particulate Filter) and SCR-units. It should be noted that the invention is suitable for application in any catalytic configuration and is therefore not confined to catalytic configurations for motor vehicles. The proposed method and the proposed system according to one aspect of the invention are well suited to other platforms which comprise a combustion engine and a catalytic configuration than motor vehicles, e.g. watercraft. The watercraft may be of any kind, e.g. motorboats, steamers, ferries or ships.

The proposed method and the proposed system according to one aspect of the invention are also well suited to, for example, systems which comprise industrial combustion engines and/or combustion engine-powered industrial robots and an associated emission control system comprising a catalytic configuration.

The proposed method and the proposed system according to one aspect of the invention are also well suited to various kinds of power plants, e.g. an electric power plant which comprises a combustion engine-powered generator and an associated emission control system comprising a catalytic configuration.

The proposed method and the proposed system are also well suited to various combustion engine systems comprising a catalytic configuration.

The proposed method and the proposed system are well suited to any engine system which comprises an engine, e.g. on a locomotive or some other platform, an associated emission control system comprising a catalytic configuration.

The proposed method and the proposed system are well suited to any system which comprises a $NO_x$-generator an associated emission control system comprising a catalytic configuration.

The term "link" refers herein to a communication link which may be a physical connection such as an optoelectronic communication line, or a non-physical connection such as a wireless connection, e.g. a radio link or microwave link.

The term "line" refers herein to a passage for holding and conveying a fluid, e.g. a reducing agent in liquid form. The line may be a pipe of any size and be made of any suitable material, e.g. plastic, rubber or metal.

The term "reductant" or "reducing agent" refers herein to an agent used for reacting with certain emissions in an SCR system. These emissions may for example be $NO_x$ gas. The terms "reductant" and "reducing agent" are herein used synonymously. In one version, said reductant is so-called AdBlue. Other kinds of reductants may of course be used. AdBlue is herein cited as an example of a reductant, but one skilled in the art will appreciate that the innovative method and the innovative system are feasible with other types of reductants.

The term "fuel" refers herein to any fuel for powering an engine having an associated emission control system comprising a catalytic configuration. Fuel may also, where applicable, be supplied to the emission control system downstream of said engine so as to control a prevailing temperature of the exhaust gas and thus the catalytic configuration. Said fuel may comprise diesel, gasoline or ethanol, or any other suitable fuel.

The term "set of causes" may according to one example herein refer to a set of causes comprising manual tampering of a reducing agent dosing system of the emission control system, such as providing a diluted reducing agent, and sulphur poisoning. The term "set of causes" may according to one example herein refer to a set of causes comprising manual tampering of a reducing agent dosing system of the emission control system, sulphur poisoning, natural aging of said catalytic configuration and accelerated aging of said catalytic configuration. The term "set of causes" may according to one example herein refer to a set of causes comprising manual tampering of a reducing agent dosing system of the emission control system, sulphur poisoning, natural aging of said catalytic configuration, accelerated aging of said catalytic configuration and mechanical failure of said catalytic configuration.

In a case where it has been determined that sulphur poisoning is not the cause, a remaining set of causes may comprise any of: manual tampering of a reducing agent dosing system; natural aging of said catalytic configuration; accelerated aging of said catalytic configuration; and mechanical failure of said catalytic configuration.

Figure 2A:
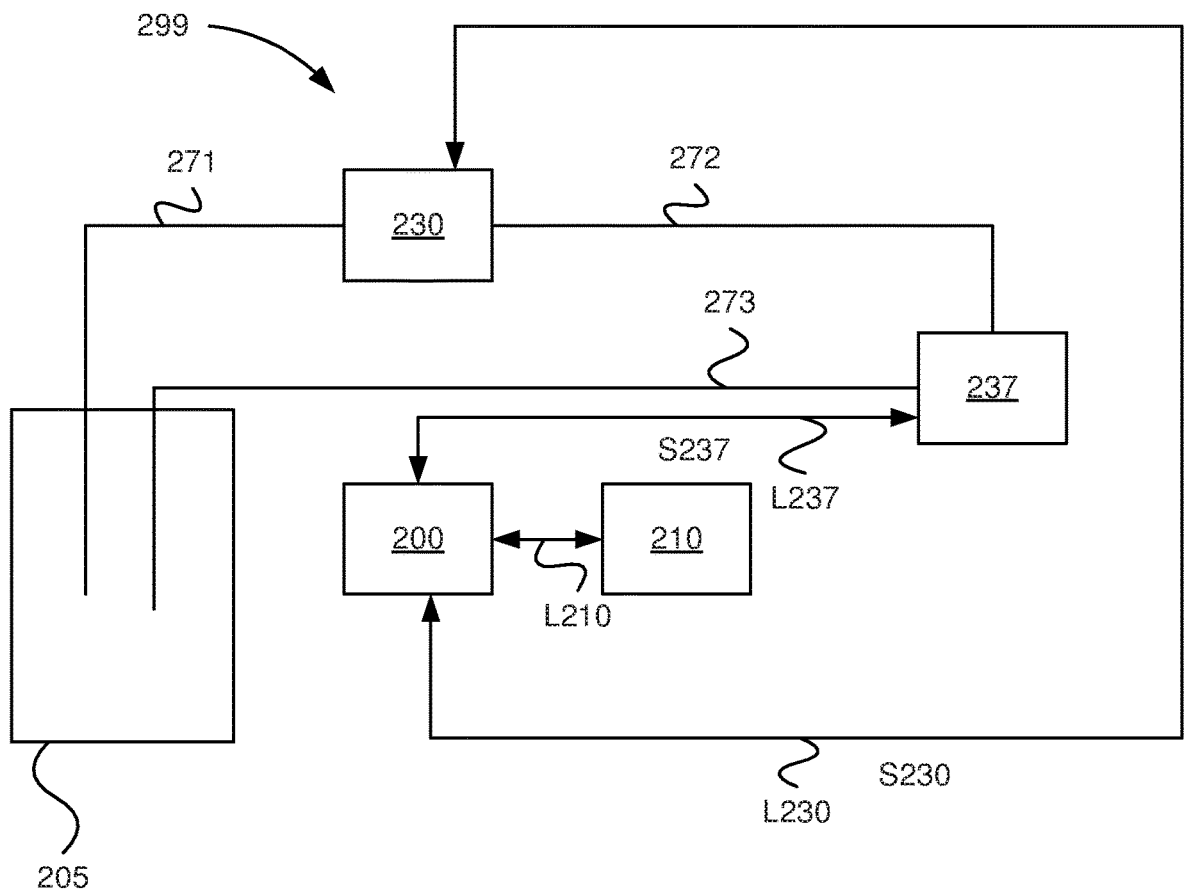
FIG. 2a schematically illustrates a system according to an embodiment of the invention.

FIG. 2a schematically illustrates a system 299 according to an example embodiment of the invention. The system 299 is situated in the tractor unit 110 and may be part of a catalytic configuration, also denoted exhaust gas processing configuration. It comprises in this example a container 205 arranged to hold a reductant. The container 205 is adapted to holding a suitable amount of reductant and also to being replenishable as necessary. The container may be adapted to hold e.g. 75 or 50 litres of reductant.

A first line 271 is provided to lead the reductant to a pump 230 from the container 205. The pump 230 may be any suitable pump. The pump 230 may be arranged to be driven by an electric motor (not depicted). The pump 230 may be adapted to drawing the reductant from the container 205 via the first line 271 and supplying it via a second line 272 to a dosing unit 237. The dosing unit 237 may also be referred to as a reducing agent dosing unit. The dosing unit 237 comprises an electrically controlled dosing valve by means of which a flow of reductant added to the exhaust system can be controlled. The pump 230 is adapted to pressurising the reductant in the second line 272. The dosing unit 237 is provided with a throttle unit, against which said pressure of the reductant may build up in the system 299.

A first control unit 200 is arranged for communication with the pump 230 via a link L230. The first control unit 200 is arranged to send control signals S230 via said link L230. The first control unit 200 is arranged to control the operation of said pump 230 so as to for example adjust flows of the reducing agent within the system 299. The first control unit 200 is arranged to control an operation power of the pump 230 e.g. by controlling the electric motor.

The dosing unit 237 is adapted to supplying said reductant to an exhaust system (see FIG. 2*b*) of the vehicle 100. More specifically, it is adapted to supplying a suitable amount of reductant in a controlled way to an exhaust system of the vehicle 100. In this version, one SCR catalyst (see FIG. 2*b*) is situated downstream of the location in the exhaust system where the supply of reductant takes place.

A third line 273 running between the dosing unit 237 and the container 205 is adapted to leading back to the container 205 a certain amount of the reductant fed to the dosing unit 237. This configuration results in advantageous cooling of the dosing unit 237. The dosing unit 237 is thus cooled by a flow of the reductant when it is pumped through it from the pump 230 to the container 205.

The first control unit 200 is arranged for communication with the dosing unit 237 via a link L237. The first control unit 200 is arranged to send control signals S237 via said link L237. The first control unit 200 is arranged to control the operation of said dosing unit 237 so as to for example control dosing of the reducing agent to the exhaust gas system of the vehicle 100. The control unit 200 is arranged to control the operation of the dosing unit 237 so as to for example adjust return flow of said reducing agent to the container 205.

A second control unit 210 is arranged for communication with the first control unit 200 via a link L210. It may be releasably connected to the first control unit 200. It may be a control unit external to the vehicle 100. It may be adapted to performing the innovative steps according to the invention. It may be used to cross-load software to the first control unit 200, particularly software for applying the innovative method. It may alternatively be arranged for communication with the first control unit 200 via an internal network on board the vehicle. It may be adapted to performing functions corresponding to those of the first control unit 200, such as e.g. determining a cause for impaired performance of a catalytic configuration for the emission control of the exhaust gas of a combustion engine, said catalytic configuration being arranged for $NO_x$-conversion.

Figure 2B:
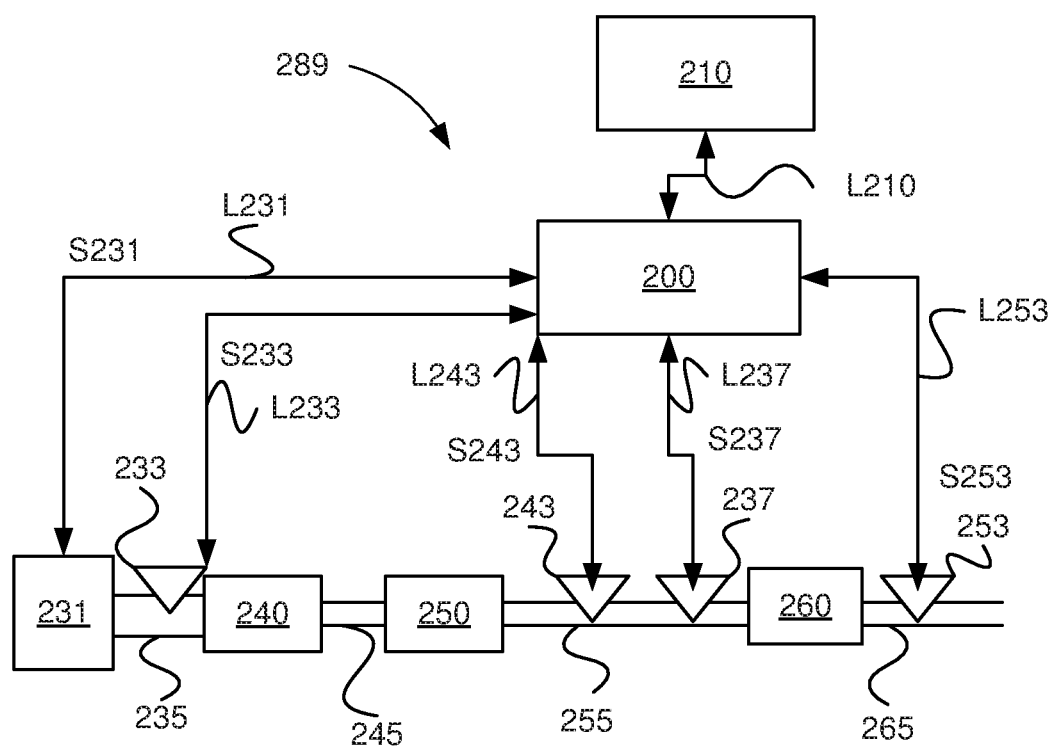
FIG. 2b schematically illustrates a system according to an embodiment of the invention.

FIG. 2*b* schematically illustrates a system 289 of the vehicle shown in FIG. 1 according to an embodiment of the invention. The system 289 may constitute a part of the inventive system for determining a cause for the impaired performance of a catalytic configuration for the emission control of the exhaust gas of a combustion engine.

A combustion engine 231 is during operation causing an exhaust gas flow which is lead via a first passage 235 to a DOC-unit 240. A second passage 245 is arranged to convey said exhaust gas flow from said DOC-unit 240 to a DPF-unit 250. A third passage 255 is arranged to convey said exhaust gas flow from said DPF-unit 250 to an SCR-unit 260. A fourth passage 265 is arranged to convey said exhaust gas flow from said SCR-unit 260 to an environment of the catalytic configuration. The catalytic configuration may comprise any of said components downstream said engine 231, including at least one member presenting catalytic features. The catalytic configuration may comprise any of said components downstream said engine 231, including at least one member presenting catalytic features being sensitive for sulphur poisoning.

Said dosing unit 237 is arranged to provide said reductant to said third passage 255 upstream of said SCR-unit 260 and downstream of said DPF-unit 250. The first control unit 200 is arranged to control the operation of said dosing unit 237 so as to, where applicable, dose reducing agent into the third passage 255.

Said SCR-unit 260 may comprise a vaporizing module (not shown) which is arranged to vaporize said dosed reducing agent so as to achieve a mixture of exhaust gas and reducing agent for treatment by means of an SCR-portion of the SCR-unit 260. Said vaporizing module may comprise a mixer (not shown) for mixing said vaporized reducing agent with the exhaust gas. Said vaporizing module may be formed in any suitable way. Said vaporizing module is configured to achieve a most effective vaporizing of the provided reducing agent as possible. Herein said vaporizing module has large surfaces where vaporizing of the provided reducing agent may be performed in an effective way. Said vaporizing module may consist of a metal or a metal alloy.

Said SCR-unit 260 may according to one possible configuration comprise an ammonia slip catalyst ASC, not illustrated.

A first $NO_x$-sensor 233 is arranged upstream said DOC-unit 240 at said first passage 235. Said first $NO_x$-sensor 233 is arranged for communication with the first control unit 200 via a link L233. The first $NO_x$-sensor 233 is arranged to continuously determine a prevailing first content of $NO_x$, denoted NOx1, in the first passage 235. The first $NO_x$-sensor 233 is arranged to continuously send signals S233 comprising information about the prevailing first content of $NO_x$ to the first control unit 200 via the link L233.

A second $NO_x$-sensor 253 is arranged downstream said SCR-unit 260 at said fourth passage 265. Said second $NO_x$-sensor 253 is arranged for communication with the first control unit 200 via a link L253. The second $NO_x$-sensor 253 is arranged to continuously determine a prevailing second content of $NO_x$, denoted NOx2, in the fourth passage 265. The second $NO_x$-sensor 253 is arranged to continuously send signals S253 comprising information about the prevailing second content of $NO_x$ to the first control unit 200 via the link L253.

Said first $NO_x$-sensor 233 and said second $NO_x$-sensor 253 may be used to provide information about prevailing contents of $NO_x$ in the first passage 235 and the fourth passage 265, respectively.

According to an example said first control unit 200 is arranged to determine said first content of $NO_x$, NOx1, according to a model stored in a memory thereof. Hereby said first control unit is arranged to continuously or intermittently determine/estimate/model/calculate a prevailing $NO_x$ content, NOx1, in said first passage 235. This model may be based on parameters such as engine speed RPM, engine load, dosed amount of fuel to said engine 231, etc.

Said first control unit 200 is arranged to continuously or intermittently determining a course of a $NO_x$-conversion ratio on the basis of said determined first $NO_x$-content, NOx1, and said determined second $NO_x$-content NOx2.

A temperature sensor 243 is arranged at the third passage 255. Said temperature sensor 243 is arranged for communication with said first control unit 200 via a link L243. Said temperature sensor 243 is arranged to continuously measure a prevailing temperature Tmeas of the exhaust gas in said third passage 255 and send signals S243 comprising information about said measured temperature Tmeas to said first control unit 200 via said link L243. Hereby it is illustrated that said temperature sensor 243 is arranged upstream of said dosing unit 237 at the third passage 255. According to another example said temperature sensor 243 is arranged downstream of said dosing unit 237 at the third passage 255. According to another example two temperature sensors may be provided at said third passage 255, wherein one temperature sensor may be positioned upstream of said dosing unit 237 and one temperature sensor may be positioned downstream of said dosing unit 237. According to this example the first control unit 200 may use a mean value of temperature values detected by means of said two temperature sensors at the third passage 255.

According to an example said first control unit 200 is arranged to determine a prevailing temperature Tmod of said exhaust gas according to a model stored in a memory thereof. Hereby said first control unit is arranged to continuously or intermittently determine/estimate/model/calculate a prevailing temperature Tmod of said exhaust gas in said third passage 255. This model may be based on parameters such as engine speed RPM, engine load, dosed amount of fuel to said engine 231, etc.

Said first control unit 200 is arranged to continuously or intermittently determine a prevailing temperature of said catalytic configuration on the basis of said measured prevailing temperature Tmeas and/or said determined prevailing temperature Tmod. Hereby said first control unit 200 is arranged to determine a temperature of any relevant unit of the emission control system, such as the DOC-unit 240, DPF-unit 250 and SCR-unit 260.

Said catalytic arrangement may comprise one or more SCR-units, a DOC-unit, a DPF-unit and an ASC-unit. Said catalytic arrangement may comprise any combination of one or more SCR-units, a DOC-unit, a DPF-unit and an ASC-unit. Hereby said first control unit 200 may be arranged to determine a means temperature of any combination of units of the emission control system, such as the DOC-unit 240, DPF-unit 250 and SCR-unit 260. This mean temperature may be controlled according to the inventive method. Hereby this mean temperature is controlled so as to increase from a prevailing temperature below a predetermined temperature value Te to a temperature above said predetermined temperature value and/or so as to decrease from a prevailing temperature above said predetermined temperature value Te to a temperature below said predetermined temperature value.

Said first control unit 200 is arranged to control the temperature of the exhaust gas flow from said engine 231 by any suitable means. Hereby said first control unit 200 is arranged to increase the temperature of said catalytic configuration from a prevailing temperature below a to a predetermined temperature value Te to a temperature above said predetermined temperature value, said predetermined temperature value Te representing a temperature above which sulphur, poisoning said catalytic configuration, is removed from said catalytic configuration so as to improve the performance of said catalytic configuration in case of sulphur, poisoning said catalytic configuration, is present.

Hereby said first control unit 200 is arranged to decrease the temperature of said catalytic configuration from a prevailing temperature above said predetermined temperature value Te to a temperature below said predetermined temperature value so as to impair the performance of said catalytic configuration in case of sulphur, poisoning said catalytic configuration, is present.

Hereby said first control unit 200 is arranged to determine one cause out of a set of causes on the basis of said course of said $NO_x$-conversion ratio thus determined.

Hereby said first control unit 200 is arranged to take the presence of poisoning sulphur in said catalytic configuration as said one cause for impaired performance of said catalytic configuration when said course of said $NO_x$-conversion ratio reveals an increased performance when the temperature is increased above said predetermined temperature value Te and exclude other causes of said set of causes.

Hereby said first control unit 200 is arranged to take the presence of poisoning sulphur in said catalytic configuration as said one cause for impaired performance of said catalytic configuration when said course of said $NO_x$-conversion ratio reveals a decreased performance when the temperature is decreased below said predetermined temperature value Te and exclude other causes of said set of causes.

Hereby said first control unit 200 is arranged to take use of a low concentration of a reducing agent introduced for $NO_x$-conversion in said exhaust gas as said one cause for impaired performance of said catalytic configuration when a change of said reducing agent to a proper concentration reducing agent reveals an increased performance of said catalytic configuration or when a change of said reducing agent from a proper concentration to a low concentration reducing agent reveals an impaired performance of said catalytic configuration. This change of said reducing agent may be indicated by means of a level sensor (not illustrated) being arranged at said tank 205. Said sensor is arranged for communication with said first control unit 200 via a suitable link (not illustrated).

Hereby said first control unit 200 is arranged to determine a change rate of said course of $NO_x$-conversion ratio and taking use of a low concentration of a reducing agent introduced for $NO_x$-conversion in said exhaust gas as said one cause of said set of causes if said change rate exceeds a certain characteristic value.

Hereby said first control unit 200 is arranged to determine said one cause out of a set of causes comprising the presence of poisoning sulphur, low concentration of a reducing agent introduced for $NO_x$-conversion in said exhaust gas, aging of catalytic substances in said catalytic configuration, accelerated aging of catalytic substances in said catalytic configuration and undesired defects related to said catalytic configuration.

Said first control unit 200 is arranged to perform the process steps depicted herein, comprising the process steps which are detailed with reference to FIG. 4*b*.

Figure 3A:
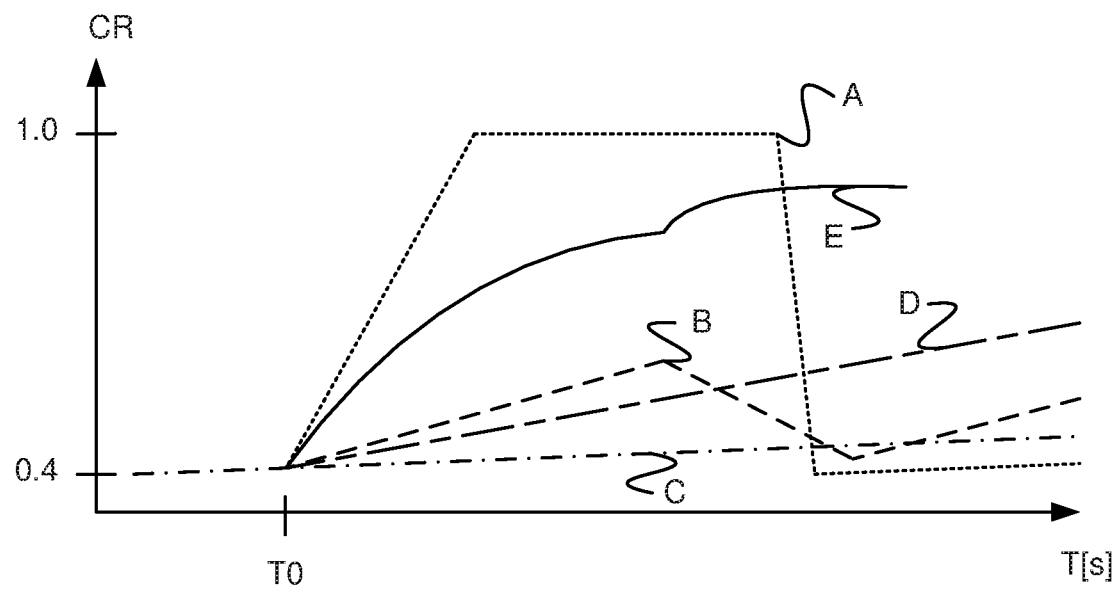
FIG. 3a schematically illustrates a diagram according to an aspect of the invention.

FIG. 3*a* schematically illustrates a diagram wherein $NO_x$-conversion CR is presented as a function of time t given in seconds s. The diagram comprises a number of graphs A-E, each representing a characteristic development of $NO_x$-conversion relating to a specific situation. The FIG. 3*a* is to be analysed in conjunction with the FIG. 3*b*.

A first graph A relates to a case where tampering of the emission control system is at hand. At a time point T0 a reducing agent having other than required and desired qualities is introduced and/or used. Hereby a level of $NO_x$- conversion ratio is increased from an acceptable level to a non-acceptable level. The $NO_x$-conversion rate is hereby staying at said level until an adequate reducing agent is used by the emission control system. When a proper reducing agent is used said $NO_x$-conversion ratio will return to acceptable levels again. It is noted that the $NO_x$-conversion ratio remains substantially unaffected by temperature variations in case tampering of the emission control system is at hand. It is characteristic that the $NO_x$-conversion rate is shifted relatively quickly to a non-acceptable level after the reducing agent having other than the required and desired qualities has been introduced and/or used. The characteristic shape of the graph A may be identified by the first control unit 200 and may thus serve as a basis for deciding if the cause for the impaired performance of the catalytic configuration is said tampering.

A second graph B relates to a case where fuel of said engine comprises too high levels of sulphur, and thus said exhaust gas also comprises sulphur. Said sulphur may hereby poison any catalytic element of the emission control system, such as the SCR-unit 260. Sulphur is hereby accumulated in said element and is gradually impairing performance of said element. It is illustrated that a $NO_x$-conversion ratio is increased as long as a temperature of the catalytic configuration is below a certain predetermined temperature Te. Said predetermined temperature value Te is representing a temperature above which sulphur, poisoning said catalytic configuration, is removed from said catalytic configuration. If the temperature of said catalytic configuration is increased above said predetermined temperature value Te the degree of sulphur poisoning is decreased resulting in a decrease of said $NO_x$-conversion ratio. By increasing said temperature from a first temperature Temp1, below said predetermined temperature Te, to a second temperature Temp2, it may be determined that sulphur poisoning is the probable cause of the impaired performance of the catalytic configuration. Also, by decreasing said temperature from the second temperature Temp2, above said predetermined temperature Te, to another temperature below said predetermined temperature Te, such as the first temperature Temp1, it may be determined that sulphur poisoning is the probable cause of the impaired performance of the catalytic configuration.

It is noted that the $NO_x$-conversion ratio is directly affected by temperature variations about said predetermined temperature Te. This is a characteristic behaviour of the determined $NO_x$-conversion ratio. In case the $NO_x$-conversion ratio is changing when shifting between temperatures below and above said predetermined temperature Te it may be determined that sulphur poisoning is the probable cause of the impaired performance of the catalytic configuration. This may be performed by means of the first control unit 200.

A third graph C relates to a case where natural aging of said catalytic configuration is at hand. The graph C may be a reference line when determining the cause of an impaired performance of a catalytic configuration for the emission control of the exhaust gas of a combustion engine. Over time the catalytic configuration is slowly degrading and thus $NO_x$-conversion capacities are impaired. It is noted that the $NO_x$-conversion ratio remains substantially unaffected when shifting the temperature between temperatures below and above said predetermined temperature Te. The characteristic shape of the graph C may be identified by the first control unit 200 and may thus serve as a basis for deciding if the cause for impaired performance of the catalytic configuration is said natural aging. It may be decided that the relevant cause of impaired performance of the catalytic configuration is natural aging if the level of the $NO_x$-conversion ratio is within a predetermined first $NO_x$-conversion ratio interval.

A fourth graph D relates to a case where accelerated aging of said catalytic configuration is at hand. Over time the catalytic configuration is degrading at a higher rate compared to natural ageing and thus $NO_x$-conversion capacities are impaired. Accelerated aging may be caused by overheating of at least one member unit of the catalytic configuration. This means that one or more member units of the catalytic configuration are exposed to temperatures which will result in a negative impact of said member units. Various substrates of said member units may be associated with different critical temperature values, i.e. a temperature value above which member unit performance may be negatively affected (accelerated aging). It is noted that the $NO_x$-conversion ratio remains substantially unaffected when shifting the temperature between temperatures below and above said predetermined temperature Te. The characteristic shape of the graph D may be identified by the first control unit 200 and may thus serve as a basis for deciding if the cause for impaired performance of the catalytic configuration is said accelerated aging. It may be decided that the relevant cause of impaired performance of the catalytic configuration is accelerated aging if the level of the $NO_x$-conversion ratio is within a predetermined second $NO_x$-conversion ratio interval. The second $NO_x$-conversion ratio interval may be different from the first $NO_x$-conversion ratio interval. $NO_x$-conversion ratio values are to be within the respective first and second $NO_x$-conversion ratio interval over time when deciding which form of aging of said catalytic configuration is at hand (natural aging, accelerated aging).

A fifth graph E relates to a case where mechanical failure of a member of the catalytic configuration is at hand. This graph may present a number of different courses, depending upon the type of mechanical failure. However, this graph will present a different pattern than the other graphs (A-D) and it will thus be relatively easy to determine if the cause is mechanical failure.

It is noted that the sign of $NO_x$-conversion ratio is dependent on the temperature of the catalytic configuration in case there is sulphur poisoning said catalytic configuration.

Figure 3B:
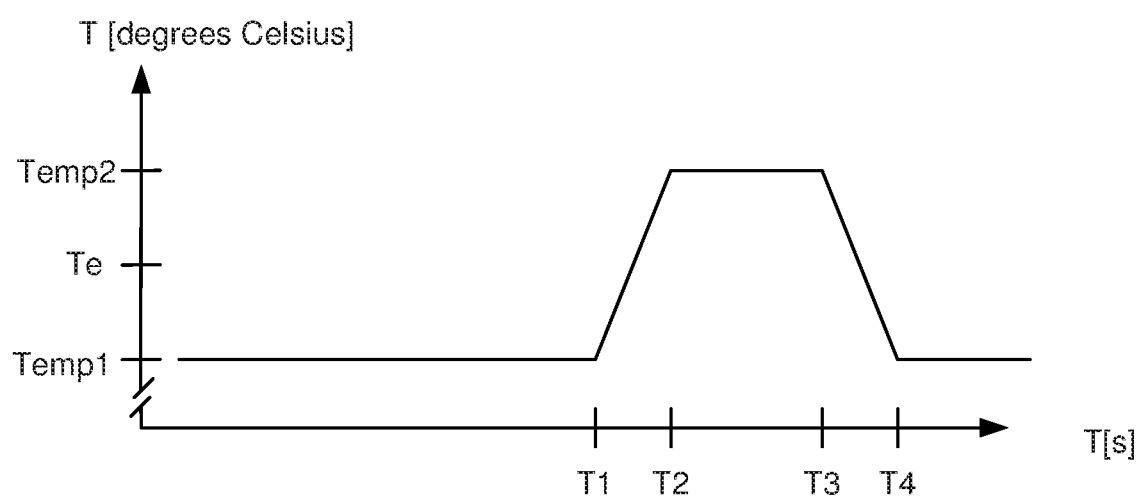
FIG. 3b schematically illustrates a diagram according to an aspect of the invention.

FIG. 3b schematically illustrates the temperature Tmeas, Tmod of the catalytic configuration given in degrees Celsius as a function of time t given in seconds s.

Herein, initially, a prevailing temperature Temp1 of said catalytic configuration is below a predetermined temperature value Te. Thereafter said temperature is increased to a second temperature Temp2, which is higher than said predetermined temperature value Te. The increase is performed during the time period T1-T2. During a certain amount of time T2-T3 said prevailing temperature is controlled to stay at a level above said predetermined temperature Te. Thereafter said temperature is decreased to a temperature, such as Temp1, below said predetermined temperature value Te. The decrease is performed during the time period T3-T4.

By analysing the behaviour of the $NO_x$-conversion ratio when controlling said temperature of said catalytic configuration a cause of impaired performance of said catalytic configuration may be determined according to the inventive method.

Figure 4A:
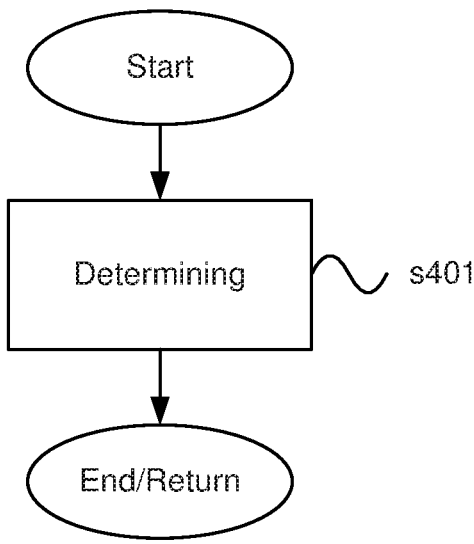
FIG. 4a is a schematic flowchart of a method according to an embodiment of the invention.

FIG. 4a schematically illustrates a flow chart of a method for determining a cause for the impaired performance of a catalytic configuration for the emission control of the exhaust gas of a combustion engine 231, said catalytic configuration being arranged for $NO_x$-conversion.

The method comprises a first method step s401. The method step s401 comprises the steps of:

continuously or intermittently determining a course of a $NO_x$-conversion ratio;

continuously or intermittently determining a prevailing temperature of said catalytic configuration;

increasing the temperature of said catalytic configuration from a prevailing temperature below a predetermined temperature value Te to a temperature above said predetermined temperature value, said predetermined temperature value Te representing a temperature above which sulphur, poisoning said catalytic configuration, is removed from said catalytic configuration so as to improve the performance of said catalytic configuration in case of sulphur, poisoning said catalytic configuration, is present; and/or decreasing the temperature of said catalytic configuration from a prevailing temperature above said predetermined temperature value Te to a temperature below said predetermined temperature value so as to impair the performance of said catalytic configuration in case of sulphur, poisoning said catalytic configuration, is present; and determining one cause out of a set of causes on the basis of said course of said $NO_x$-conversion ratio thus determined.

After the method step s401 the method ends/is returned.

Figure 4B:
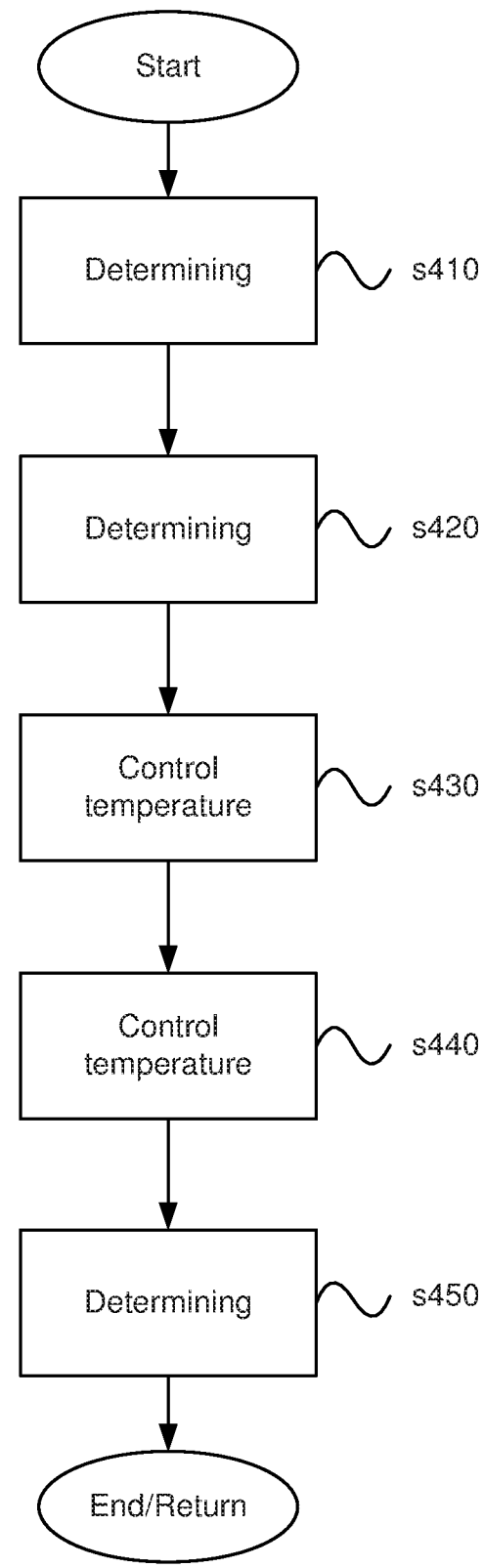
FIG. 4b is a schematic flowchart of a method according to an embodiment of the invention.

FIG. 4*b* schematically illustrates a method for determining a cause for impaired performance of a catalytic configuration for the emission control of the exhaust gas of a combustion engine, said catalytic configuration being arranged for $NO_x$-conversion.

The method comprises a first method step s410. The method step s410 comprises the step of continuously or intermittently determining a course of a $NO_x$-conversion ratio. This may be performed by means of said first control unit 200. This may be performed on the basis of determined $NO_x$ values detected by the first $NO_x$-sensor 233 and the second $NO_x$-sensor 253. Alternatively said first $NO_x$ value may be calculated. Herein the term determining intermittently, regarding the $NO_x$-conversion ratio, means that a $NO_x$-conversion ratio may be determined on the basis of corresponding first and second $NO_x$ values, which pair of values is determined every 2, 5, 10, 30 or more seconds.

The course of the $NO_x$-conversion ratio may according to one example be determined before, during and after a temperature change, which temperature change is relating to a temperature change passing the predetermined temperature value Te.

The course of the $NO_x$-conversion ratio may according to one example be determined only before and after a temperature change, which temperature change is relating to a temperature change passing the predetermined temperature value Te.

After the method step s410 a subsequent method step s420 is performed.

The method step s420 comprises the step of continuously or intermittently determining a prevailing temperature of said catalytic configuration. This may be performed a number of different ways. The temperature of said catalytic configuration may relate to a measured or calculated/estimated/modelled/determined temperature value of the SCR-unit 260. The temperature of said catalytic configuration may relate to a measured or calculated/estimated/modelled/determined temperature value of a number of units of the catalytic configuration.

Herein the term determining intermittently, regarding the temperature, means that a temperature of said catalytic configuration may be determined every 2, 5, 10, 30 or more seconds.

The temperature may according to one example be determined before, during and after a temperature change, which temperature change is related to a temperature change passing the predetermined temperature value Te.

The temperature may according to one example be determined before and after a temperature change, which temperature change is related to a temperature change passing the predetermined temperature value Te.

After the method step s420 a subsequent method step s430 is performed.

The method step s430 comprises the step of increasing the temperature of said catalytic configuration from a prevailing temperature below a to a predetermined temperature value Te to a temperature above said predetermined temperature value. Said predetermined temperature value Te is representing a temperature above which sulphur, poisoning said catalytic configuration, is removed from said catalytic configuration so as to improve the performance of said catalytic configuration in case of sulphur, poisoning said catalytic configuration, is present. The temperature below the predetermined temperature value Te may be the temperature Temp1. The temperature above said predetermined temperature value Te may be the temperature Temp2.

By controlling said temperature of said catalytic configuration so as to increase said temperature according to the proposed method it is possible to identify sulphur poisoning, if any, as a cause of impaired performance of said catalytic configuration.

According to one example the step of continuously or intermittently determining a course of a $NO_x$-conversion ratio according to step s410 may be performed during temperature increase process according to the step s430. According to one example the step of continuously or intermittently determining a course of a $NO_x$-conversion ratio according to step s410 is performed during temperature increase process according to the step s430.

The method step s440 comprises the step of decreasing the temperature of said catalytic configuration from a prevailing temperature above said predetermined temperature value Te to a temperature below said predetermined temperature value so as to impair the performance of said catalytic configuration in case of sulphur, poisoning said catalytic configuration, is present. By controlling said temperature of said catalytic configuration so as to decrease said temperature according to the inventive method it is possible to identify sulphur poisoning, if any, as a cause of impaired performance of said catalytic configuration. The temperature below the predetermined temperature value Te may be the temperature Temp1. The temperature above said predetermined temperature value Te may be the temperature Temp2.

According to one example, the step of continuously or intermittently determining a course of a $NO_x$-conversion ratio according to step s410 may be performed during the temperature decrease process according to the step s440.

According to one example, the step of continuously or intermittently determining a course of a $NO_x$-conversion ratio according to step s410 is performed during the temperature decrease process according to the step s440.

One of the method steps s430 and s440 may be omitted according to an example of the inventive method. According to one example the method step s440 is performed before the method step s430. According to one example the method comprises performing a number of steps s430 and/or a number of steps s440.

After the method step s440 a subsequent step s450 is performed.

The step s450 comprises the step of determining one cause out of a set of causes on the basis of said course of said $NO_x$-conversion ratio thus determined. Said set of causes may comprise presence of poisoning sulphur, low concentration of a reducing agent introduced for $NO_x$-conversion in said exhaust gas, aging of the catalytic substances in said catalytic configuration and the undesired defects related to said catalytic configuration.

According to one example embodiment it is in a first action determined if the cause is poisoning sulphur. This may be performed on the basis of $NO_x$-conversion ratio changes characteristically when increasing and/or lowering the temperature above and under the predetermined temperature Te. As a second action, if the cause is not determined to be poisoning sulphur, the cause may be determined on the basis of comparisons between the determined $NO_x$-conversion ratio course and the predetermined $NO_x$-conversion ratio courses, each representing a different cause among a set of courses. The set of courses may according to one example hereby be at least one among:

a) manual tampering of a reducing agent dosing system;
b) natural aging of said catalytic configuration;
c) accelerated aging of said catalytic configuration; and
d) mechanical failure of said catalytic configuration.

Hereby one cause out of the set of causes may be determined.

According to one embodiment it is in a first action determined if the cause is poisoning sulphur or manual tampering of a reducing agent dosing system. In this example it is determined that the cause is manual tampering if it is decided that the cause is not poisoning sulphur.

The step s450 may comprise the step of taking a proper action depending upon which cause is determined. Said action may be engine torque limiting actions (in case of tampering of the catalytic configuration e.g. using inadequate reductant), generating error codes (in case of sulphur poisoning), generating and displaying information for an operator of the vehicle (in case of sulphur poisoning), etc.

After the step s450 the method is ended/returned.

Figure 5:
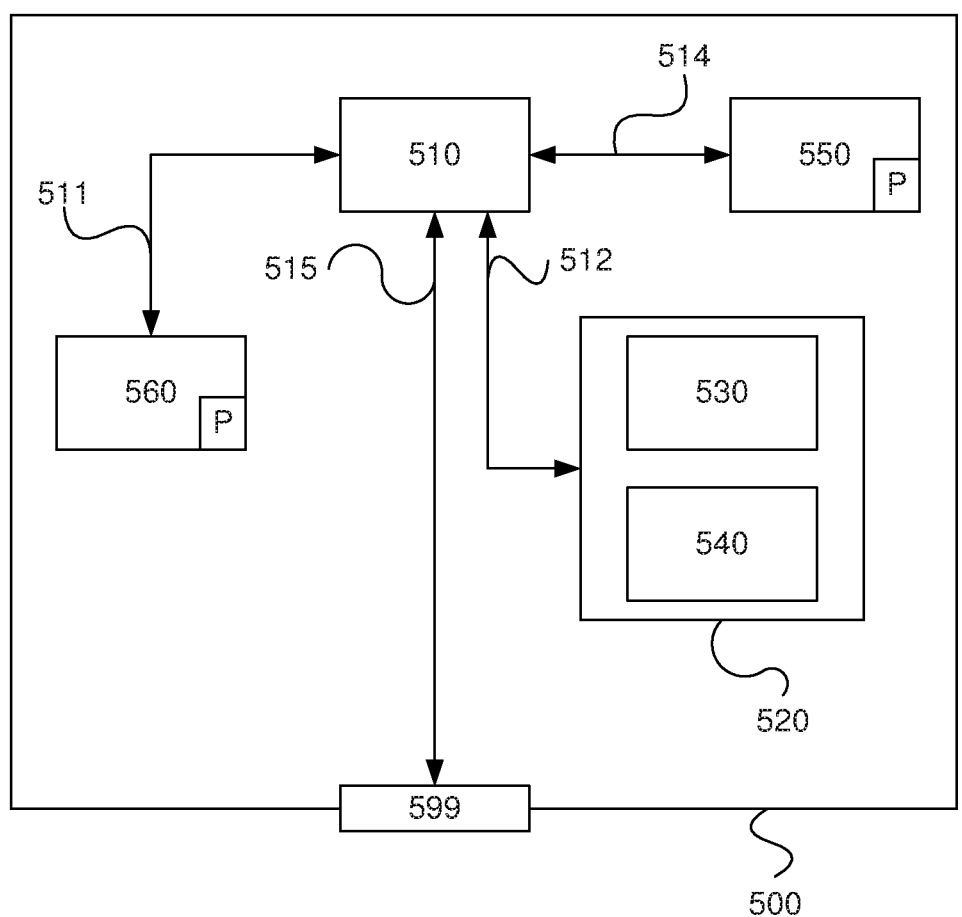
FIG. 5 schematically illustrates a computer according to an embodiment of the invention.

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for determining a cause for the impaired performance of a catalytic configuration for the emission control of the exhaust gas of a combustion engine 231, said catalytic configuration being arranged for $NO_x$-conversion.

The computer program P may comprise routines for continuously or intermittently determining a course of a $NO_x$-conversion ratio (NOx1/NOx2).

The computer program P may comprise routines for continuously or intermittently determining a prevailing temperature of said catalytic configuration.

The computer program P may comprise routines for controlling an increase of the temperature of said catalytic configuration from a prevailing temperature below a predetermined temperature value Te to a temperature above said predetermined temperature value, said predetermined temperature value Te representing a temperature above which sulphur, poisoning said catalytic configuration, is removed from said catalytic configuration so as to improve the performance of said catalytic configuration in case of sulphur, poisoning said catalytic configuration, is present.

The computer program P may comprise routines for controlling a decrease of the temperature of said catalytic configuration from a prevailing temperature above said predetermined temperature value Te to a temperature below said predetermined temperature value so as to impair the performance of said catalytic configuration in case of sulphur, poisoning said catalytic configuration, is present.

The computer program P may comprise routines for determining one cause out of a set of causes on the basis of said course of said $NO_x$-conversion ratio thus determined.

The computer program P may comprise routines for taking the presence of poisoning sulphur in said catalytic configuration as said one cause for the impaired performance of said catalytic configuration when said course of said $NO_x$-conversion ratio reveals an increased performance when the temperature is increased above said predetermined temperature value Te and exclude other causes of said set of causes.

The computer program P may comprise routines for taking the presence of poisoning sulphur in said catalytic configuration as said one cause for the impaired performance of said catalytic configuration when said course of said $NO_x$-conversion ratio reveals a decreased performance when the temperature is decreased below said predetermined temperature value and exclude other causes of said set of causes.

The computer program P may comprise routines for taking use of a low concentration of a reducing agent introduced for $NO_x$-conversion in said exhaust gas as said one cause for the impaired performance of said catalytic configuration when a change of said reducing agent to a proper concentration reducing agent reveals an increased performance of said catalytic configuration or when a change of said reducing agent from a proper concentration to a low concentration reducing agent reveals an impaired performance of said catalytic configuration.

The computer program P may comprise routines for determining a change rate of said course of $NO_x$-conversion ratio and taking use of a low concentration of a reducing agent introduced for $NO_x$-conversion in said exhaust gas as said one cause of said set of causes if said change rate exceeds a certain characteristic value.

The computer program P may comprise routines for determining said one cause out of a set of causes comprising the presence of poisoning sulphur, low concentration of a reducing agent introduced for $NO_x$-conversion in said exhaust gas, aging of the catalytic substances in said catalytic configuration and the undesired defects related to said catalytic configuration.

The computer program P may comprise routines for performing any of the process steps detailed with reference to FIG. 4b.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L230, L231, L233, L237, L243 and L253, for example, may be connected to the data port 599 (see FIGS. 2a and 2b).

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, method steps and process steps herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The components and features specified above may within the framework of the invention be combined between different embodiments specified.

The invention claimed is:

1. A method for determining a cause for impaired performance of a catalytic configuration for emission control of exhaust gas of a combustion engine, said catalytic configuration being arranged for NOx-conversion, the method comprising:
   continuously or intermittently determining a course of a NOx-conversion ratio;
   continuously or intermittently determining a prevailing temperature of said catalytic configuration;
   increasing the temperature of said catalytic configuration from a prevailing temperature below a predetermined temperature value to a temperature above said predetermined temperature value, said predetermined temperature value representing a temperature above which sulphur, poisoning said catalytic configuration, is removed from said catalytic configuration so as to improve the performance of said catalytic configuration in case sulphur, poisoning said catalytic configuration, is present; or alternately decreasing the temperature of said catalytic configuration from a prevailing temperature above said predetermined temperature value to a temperature below said predetermined temperature value so as to impair the performance of said catalytic configuration in case sulphur, poisoning said catalytic configuration, is present;
   determining one cause for impaired performance of said catalytic configuration out of a set of causes on the basis of said course of said NOx-conversion ratio obtained upon said increasing, or alternately, upon said decreasing, of the temperature of said catalytic configuration; and
   determining a change rate of said course of said NOx-conversion ratio and taking use of a low concentration of a reducing agent introduced for NOx-conversion in said exhaust gas as said one cause of said set of causes when said change rate exceeds a certain characteristic value.

2. The method according to claim 1, further comprising:
   taking the presence of poisoning sulphur in said catalytic configuration as one cause for said impaired performance of said catalytic configuration when said course of said NOx-conversion ratio reveals an increased performance of said catalytic configuration when the temperature is increased above said predetermined temperature value and exclude other causes of said set of causes.

3. The method according to claim 1, further comprising:
   taking the presence of poisoning sulphur in said catalytic configuration as one cause for said impaired performance of said catalytic configuration when said course of said NOX-conversion ratio reveals a decreased performance of said catalytic configuration when the temperature is decreased below said predetermined temperature value and exclude other causes of said set of causes.

4. The method according to claim 1, further comprising:
   taking use of a low concentration of a reducing agent introduced for NOx-conversion in said exhaust gas as one cause for said impaired performance of said catalytic configuration when a change of said reducing agent to a proper concentration reducing agent reveals an increased performance of said catalytic configuration or when a change of said reducing agent from said proper concentration to a low concentration reducing agent reveals an impaired performance of said catalytic configuration.

5. The method according to claim 1, wherein said set of causes comprises presence of poisoning sulphur, low concentration of a reducing agent introduced for NOx-conversion in said exhaust gas, aging of catalytic substances of said catalytic configuration and undesired defects related to said catalytic configuration.

6. A computer program product containing a program code stored on a computer-readable medium for performing method steps according to claim 1, when said computer program is run on an electronic control unit or a computer connected to the electronic control unit.

7. A system for determining a cause for impaired performance of a catalytic configuration for emission control of exhaust gas of a combustion engine, said catalytic configuration being arranged for NOx-conversion, the system comprising:
   first means being arranged to continuously or intermittently determine a course of a NOx-conversion ratio;
   second means being arranged to continuously or intermittently determine a prevailing temperature of said catalytic configuration;
   third means being arranged to increase the temperature of said catalytic configuration from a prevailing temperature below a predetermined temperature value to a temperature above said predetermined temperature value, said predetermined temperature value representing a temperature above which sulphur, poisoning said catalytic configuration, is removed from said catalytic configuration so as to improve the performance of said catalytic configuration in case sulphur, poisoning said catalytic configuration, is present; or alternately;

fourth means being arranged to decrease the temperature of said catalytic configuration from a prevailing temperature above said predetermined temperature value to a temperature below said predetermined temperature value so as to impair the performance of said catalytic configuration in case sulphur, poisoning said catalytic configuration, is present; and fifth means being arranged to determine one cause for impaired performance of the catalytic configuration out of a set of causes on the basis of said course of said NOx-conversion ratio obtained upon said increasing, or alternately upon said decreasing, of the temperature of said catalytic configuration; and sixth means being arranged to determine a change rate of said course of said NOx-conversion ratio and taking use of a low concentration of a reducing agent introduced for NOx-conversion in said exhaust gas as said one cause of said set of causes when said change rate exceeds a certain characteristic value.

8. The system according to claim 7, further comprising:
seventh means being arranged to take the presence of poisoning sulphur in said catalytic configuration as one cause for said impaired performance of said catalytic configuration when said course of said NOx-conversion ratio reveals an increased performance of the catalytic configuration when the temperature is increased above said predetermined temperature value and exclude other causes of said set of causes.

9. The system according to claim 7, further comprising:
seventh means being arranged to take the presence of poisoning sulphur in said catalytic configuration as one cause for said impaired performance of said catalytic configuration when said course of said NOx-conversion ratio reveals a decreased performance of the catalytic configuration when the temperature is decreased below said predetermined temperature value and exclude other causes of said set of causes.

10. The system according to claim 7, further comprising:
seventh means being arranged to take use of a low concentration of a reducing agent introduced for NOx-conversion in said exhaust gas as one cause for said impaired performance of said catalytic configuration when a change of said reducing agent to a proper concentration of reducing agent reveals an increased performance of said catalytic configuration or when a change of said reducing agent from said proper concentration to a low concentration reducing agent reveals an impaired performance of said catalytic configuration.

11. The system according to claim 7, wherein said set of causes comprises presence of poisoning sulphur, low concentration of a reducing agent introduced for NOx-conversion in said exhaust gas, aging of catalytic substances of said catalytic configuration and undesired defects related to said catalytic configuration.

12. A vehicle comprising a system according to claim 7.

13. The vehicle according to claim 12, wherein said vehicle is a truck, a bus, or a passenger car.

* * * * *